United States Patent

Mackerle

[15] 3,642,082
[45] Feb. 15, 1972

[54] DRIVE WHEEL OF VEHICLE

[72] Inventor: Julius Mackerle, Prague, Czechoslovakia

[73] Assignee: Ustav pro vyzkum motorovych vozidel, Prague, Czechoslovakia

[22] Filed: Feb. 4, 1970

[21] Appl. No.: 8,562

[30] Foreign Application Priority Data

Feb. 6, 1969 Czechoslovakia..................775-69

[52] U.S. Cl............................................180/8 F, 180/66 B
[51] Int. Cl.........................................................B62d 57/02
[58] Field of Search.............................................180/8 F, 66

[56] References Cited

UNITED STATES PATENTS

| | | | |
|---|---|---|---|
| 584,218 | 6/1897 | Goddard | 180/8 F |
| 210,492 | 12/1878 | Broja | 180/8 F |
| 581,278 | 4/1897 | Goddard | 180/8 F |
| 3,194,180 | 7/1965 | Mackerle | 180/66 B X |

*Primary Examiner*—Leo Friaglia
*Attorney*—Richard Low and Murray Schaffer

[57] ABSTRACT

In a vehicle a compressed gas driven wheel comprising a stationary hollow axle having at least one hole formed in its wall, a body rotatably mounted about said axle, a plurality of globular resilient chambers mounted on the outer surface of said body to form a circular series of ground-engaging members, a duct leading from each of said chambers to said axle in communication with the hole in said wall, a suspension system for said axle comprising a pair of hollow arms respectively connected at one end to each end of said axle and at their other end to said vehicle, said arms communicating with a source of compressed gas and control means surrounding said axle to adjust the flow of gas into said chambers to thereby control the movement of said wheel.

8 Claims, 2 Drawing Figures

PATENTED FEB 15 1972 3,642,082
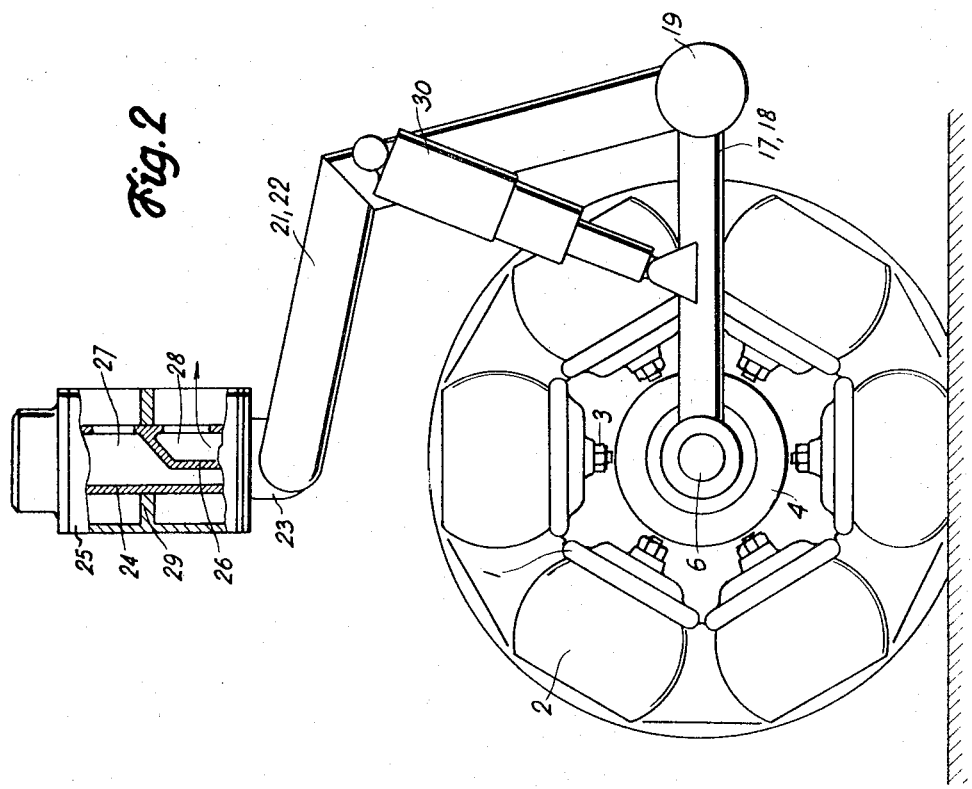
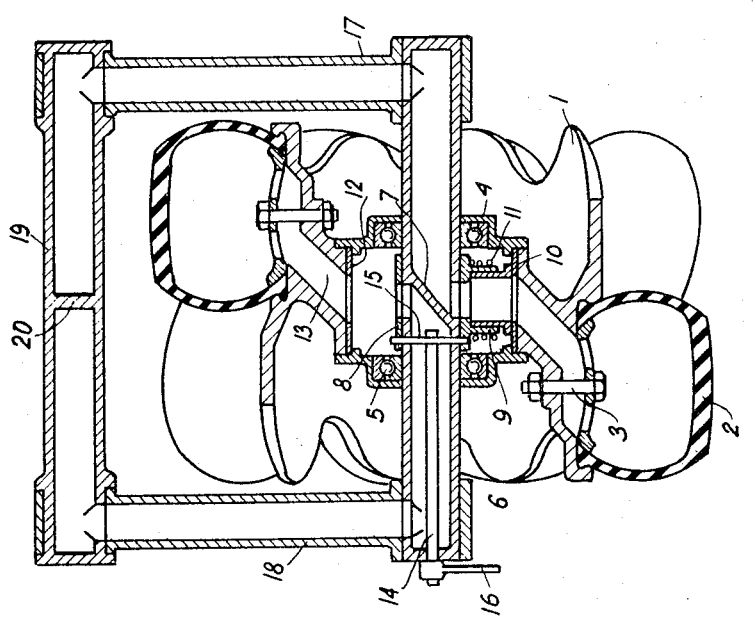
JULIUS MACKERLE
INVENTOR
BY *Henry Schaffer*
ATTORNEY 3,642,082

DRIVE WHEEL OF VEHICLE

BACKGROUND OF INVENTION

The present invention relates to power mechanism for vehicles and in particular to a driver wheel propelled by pneumatic or hydraulic actuation of a series of circularly arranged expansion chambers.

Drive wheels of the type herein discussed commonly referred to as driver, are provided on its periphery with at least one series of gas chambers with resilient walls, spaced from and noncommunicating with each other. Each of the gas chambers are separately connected with a supply of compressed gas and a control mechanism arranged at the center of the wheel for supplying and exhausting the compressed gas for the purpose of controlling the timing of the gas supply. The resultant of the pressures in the contact surface of the gas chambers with the ground during travelling lies outside a vertical plane passing through the axis of the driver, so that the vehicle can be propelled in either direction.

Existing drive wheels of vehicles of this type are arranged on axles which are connected only at one end in cantilevered manner so that the axles and are unfavorably stressed and must therefore be designed with greater dimensions. In addition these pins must be provided not only with a hole for the supply of compressed gas but also with another hole running nearby in the same direction for exhausting the compressed air back into the source, and with a third hole running also in the same direction for accommodating a mechanism rotating the control ring. All this considerably reduces the cross section of the axle so that the diameter of the wheel axle or pin must be increased. The resulting very strong wheel axle or pin leads to large diameters of rolling-contact bearings, of the control mechanism and of the entire central portion of the wheel. Consequently, the entire construction of the wheel is bulky, larger and more expensive. A reduction in the diameter of the nonthrough pin of the wheel by boring smaller holes for supplying and exhausting the compressed air leads to a larger flow resistance and thus also to losses of operational pressure and power.

The said design difficulties are still further increased if the driver is also used as a steerable wheel for controlling the driving direction of the vehicle with the necessary joint for swinging the wheel.

It is an object of the invention to eliminate or to reduce the aforementioned drawbacks.

SUMMARY OF INVENTION

This object is achieved by the driver in accordance with the invention by providing the wheel and a hollow wheel journal or axle designed as a through supporting beam with two supports and on which there is arranged in rotary relationship a control mechanism with a hole opening in a radial direction into a connecting wheel duct. On one end of this hollow axle there is attached a supporting lateral hollow supply arm, and on the other end there is attached a supporting lateral hollow outlet arm in such a manner that the free ends of these two arms are rotatably arranged and journaled in a hollow transverse shaft member of a suspension fork mechanism. The shaft is divided by a partition into a hollow supply part which is connected with the hollow supply arm of the suspension fork, and into a hollow outlet part which is connected with the hollow outlet arm of the suspension fork.

This design has the advantage that the hollow through axle is stressed more favorably and may therefore have smaller dimensions, and the dimensions and weights of the rolling contact bearings, control mechanism and of the entire central part of the wheel may also be smaller, thus also reducing their production costs.

The reduction of the diameter of the axle, rolling contact bearings, control mechanism and of the wheel center permits the use of a tubular axle closed at both ends and divided in its center by a partition into a hollow supply and a hollow outlet section. The cross section of the axle is thereby reduced so that it has at most only one hole, and not the two or three holes running in the same direction for supplying and exhausting compressed air, and for the mechanism for rotating the control ring, as seen in the prior art.

Another advantage resides in that a special hole for the mechanism for rotating a control ring is no longer needed. This is due to the fact that it is now possible to axially arrange a rod for adjusting a control sleeve, the cavity of the supply and outlet parts of the hollow axle. The rod is provided on its inner end, with a driving peg attached diametrally. The ends of this driving peg pass through arcuately longitudinal slots in the wall of the hollow through pin of the wheel and extend into the control ring.

Another advantage of the invention resides in the fact that this driver may be arranged in a simple manner so that it serves also as a wheel for controlling the driving direction of the vehicle. It is sufficient to attach the free ends of the suspension fork to the hollow head of a hollow steering column pin arranged to rotate in a stationary control bearing. The continuous cavity of the head and of the pin being divided by a common partition into a supply space connected with the cavity of the supply arm of the suspension fork, and into an outlet space connected with the cavity of the outlet arm of the suspension fork. Moreover, this system is advantageous in that it permits an unlimited swing of the wheel and thus a minimum radius of rotation which is of importance particularly with large and cross-country vehicles.

DESCRIPTION OF DRAWINGS

The invention will be best understood from the following specification to be read in conjunction with the accompanying drawings in which:

FIG. 1 represents a cross-sectional plan view of a wheel pin, supporting arms and a suspension partition; and FIG. 2 represents a side elevation of the entire arrangement of the driver with the suspension and the control pin with its bearing in partial section.

Referring now more particularly to the figures, the wheel comprises a body 1 provided in a known manner with two series of spatially noncommunicating globular gas chambers 2 fastened thereto by screws in a well-known manner. Each globular chamber is made of rubber or similar resilient material with a tread portion and a head portion as is also well known. The two rows of gas chambers 2 are offset from each other by half the mutual distance between two chambers so that the gas chambers of the first row and of the second row are alternatively brought into contact with the ground during travelling, or in other words, their contact with the ground is phase interlaced. The body 1 is mounted by means of two lateral annular discs 4 and two rolling contact bearings 5 on a hollow tubular axle 6 constructed as a supporting beam with caps closing each end. The axle 6 has a radial opening at each and two holes at its center. An inclined wall partition 7 bridging the central holes of the axle divides the interior of the axle 6 into a hollow supply section, on the right, and a hollow exhaust section on the left, as seen in FIG. 1.

A control sleeve 8 is rotatably mounted about the axle 6 within the axial space between the discs 4. The sleeve 8 is formed with a housing 9. A casing ring 12 is also fixedly secured to the discs 4 and spaced from the sleeve 8 to form an annular chamber about the sleeve. Both the sleeve 8 and the casing 12 are provided with mating cooperative apertures conforming in number of globes 2. Mounted within the housing 9 between the sleeve 8 and the casing 12 is a hollow slide valve 10 resiliently biased by a spring 11 into sliding engagement with the casing 12. The slide valve 10 successively corresponds with the opening in casing 12, as the wheel rotates. Communicating with the openings in casing 12 is a duct 13 leading to each of the chambers 2. The peripheral openings of the casing 12 as well as the opening of the control slide valve 10 stand in radial direction against a connecting duct 13 leading to each chamber through which compressed gas may be alternately supplied to and exhausted from the chambers 2 in accordance with the angular position of the wheel.

The control sleeve 8 is provided with an actuating rod 14 passing axially through the outlet part of the hollow axle 6. The inner end of the rod 14 is provided with a diametrically mounted driving peg 15 the ends of which pass through diametrically opposed elongated slots in the wall of the hollow axle 6 which allow angular movement about the wheel axis. The pegs 15 extend into fixed engagement with the control sleeve 8. The actuating rod 14 passes in the outward direction through an opening in the end closure member of the axle 6, and is provided on the outside thereof with an actuating lever 16 or another suitable handle element by which it may be rotated about the axis of the axle 6 to adjust the relative position of the sleeve 8 and the holes in the axle 6 with the casing 12.

At the right-hand end or at the end of the supply part of the axle 6 is attached a supporting lateral hollow supply arm 17. At the left-hand end or at the end of the outlet part of the axle 6 is attached a supporting lateral hollow outlet arm 18. The free ends of these two arms 17 and 18 are rotatably journaled about the ends of a hollow shaft 19. The shaft 19 is a portion of a suspension fork mechanism for supporting the wheel, and is divided by a partition 20 into a hollow supply portion connected with a hollow supply arm 21, and into a hollow outlet part connected with a hollow outlet arm 22.

In the case of an ordinary fixed wheel driver construction the arms 21 and 22 are respectively attached to the frame of the vehicle and their cavities are connected with a source of compressed gas (not shown) to form a closed gas circulation cycle between the source and each of the gas chambers 2. In the case of a driver which also serves as a steerable wheel, controlling the travelling direction, the free ends of the arms 21 and 22 are respectively attached to a hollow head 23 of a hollow vertical rotatable pin 24 mounted in a bearing 25 attached to the frame of the vehicle. The interior of the head 23 and of the control pin 24 is divided by a common partition 26 into a supply space 27 connected with the cavity of the supply arm 21 and into an outlet space 28 connected with the outlet arm 22. The spaces 27 and 28 are here connected with a source of compressed gas (not shown) whereby the circulation cycle of the gas is also closed. The hollow bearing 25 is divided into low and upper chambers separated from each other by a gas-impervious partition with a packing 29.

Suspension of either the ordinary fixed wheel, or the controlled steerable type, is accomplished by at least one helical metal spring, or by a pneumatic or hydropneumatic spring combined with a relevant shock absorber 30, arranged between the supporting lateral hollow arms 17 and 18 and the hollow arms 21 and 22.

The above-described device operates in the following manner:

Highly compressed gas, as for example air, is fed from the source directly or through the control pin 24 into the hollow supply arm 21 and thence into the hollow supply part of the shaft 19. From there the compressed gas is led through the supporting lateral supply arm 17 into the supply part of the axle 6, the further through the radially arranged opening of the control slide valve 10. The gas passes through the connecting duct 13 into the one gas chamber 2 which is just positioned on the ground in the corresponding rotary position behind the perpendicular plane passing through the axis of the driver. As seen in FIG. 2, if the direction of travel is to the left, then the gas is passed into the chamber of the laterally offset row immediately to the right of this chamber shown resting on the ground. This gas chamber is inflated by the supplied compressed gas lifting the vehicle vertically and because of its offset and rearward position presses it forward. However, as soon as the driver is thus caused to turn, the next following gas chamber 2 begins to fill with gas, and the whole cycle is repeated. The compressed gas expands as it enters each of these consecutive gas chambers 2 and after performing work in this manner, causes the chambers to reach a certain rotary position. At this certain position the gas leaves the gas chambers 2, through the connecting duct 13 and the control slide valve 10 into the space around the control ring 8, and hence into the outlet part of the axle 6. Through the joined supporting lateral hollow outlet arm 18 the expanded gas, now at a lower pressure, returns through the lateral arm 18, hollow outlet portion of the shaft 19 and the outlet arm 22 directly, or via the control pin 24 to the source of compressed air.

The control mechanism 14, 15, 16 makes it possible to adjust the position of the control ring 8 with its control slide valve 10 about the hollow axle 6 either into a neutral position in which the vehicle is propelled neither forward nor backward, or into a position allowing gas to enter the ducts 13 behind the perpendicular plane passing through the axis of the driver so that the vehicle is propelled forward, or into a position allowing gas to enter into the ducts 13 in front of the said plane in which the vehicle is consequently propelled backward.

If the control valve 10 is adjusted by turning it a great extent from the central position, the compressed gas is supplied into the gas chambers at a later moment and at a time when their distance from the central position indicated by the vertical plane is already large, and due to the fact that mainly the gas chambers carry the vehicle, they also produce a large driving moment. By reducing the extent to which the control slide valve 10 is turned in the direction of the central position, the driving moment is also reduced. The value of the driving moment can also be regulated by the difference in the pressures of the supplied and exhausted gas. This pressure difference may also be used for automatic turning the control slide valve.

What is claimed is:

1. Drive wheel of a vehicle having an axle provided on its periphery with at least one series of radially disposed gas chambers with resilient walls and spatially noncommunicating with each other, each of the said chambers being separately connected through a connecting duct with a distributor arranged about the axle of the wheel for the alternate supply and outlet of compressed gas said distributor being provided with a control sleeve arranged rotatably about said axle for supplying and letting out the compressed gas and for controlling the timing of the gas supply in such a manner that the resultant of the pressures in the contact surface of the driver with the ground during travelling lies outside a vertical plane passing through the axle of the driver, said wheel comprising a hollow through beam having a partition dividing the interior thereof into two parts and a hole opening in a radial direction from each of said interior parts in communication with said connecting ducts a supporting lateral hollow supply arm located at one end of said axle and a supporting lateral hollow outlet arm located at the other end of said axle, a transverse hollow member rotatably journaled to each of the free ends of said inlet and outlet arms, said transverse hollow member having a central portion dividing the interior into two parts respectively communicating with each of said inlet and outlet arms, and a suspension system fork comprising a pair of arms secured to the vehicle respectively communicating in a gas supply system and said inlet and outlet portions of said transverse member.

2. Driver as claimed in claim 1, characterized in that the hollow through pin of the wheel is designed as a hollow tube closed at both ends and divided at the center by a partition into a hollow supply part and into a hollow outlet part.

3. Drive wheel as claimed in claim 1 including means for turning the control sleeve comprising an actuating rod arranged within the hollow axle, said actuating rod passing axially through the cavity of the supply part and extending outwardly of the axle and being provided on its inner end with a diametrally attached peg, the ends of which pass through longitudinal openings in the wall of the axle and extend into engagement with the control ring.

4. Drive wheel as claimed in claim 1 wherein the free ends of the hollow arms of the suspension fork are attached to a hollow head of a control pin rotatably mounted in a stationary bearing, the cavity of the head and of the pin being divided by a common partition into a supply space connected with the cavity of the supply arm of the suspension fork, and into an outlet space connected with the cavity of the outlet arm of the suspension fork.

5. In a vehicle, a compressed gas driven wheel comprising a stationary hollow axle having a pair of holes radially offset from each other, formed in its wall, a body rotatably mounted about said axle, a plurality of globular resilient chambers mounted on the outer surface of said body to form a circular series of ground-engaging members, a duct leading from each of said chambers to said axle, each of said ducts being adapted to register sequentially in communication with the holes in said wall on rotation of said body, a suspension system for said axle comprising a pair of hollow arms respectively connected at one end to each end of said axle and at their other end to said vehicle, said arms communicating with a source of compressed gas and control means surrounding said axle to selectively adjust the flow of gas into one of said chambers and exhaust gas from another of said chambers to thereby control the movement of said wheel in dependence on the expansion and contraction of said chambers.

6. A driven wheel for a vehicle in accordance with claim 5 wherein said control means is arranged to supply gas thereto in such a manner that the resultant of pressure in the contact surface of the chamber, with regard to the ground, lies outside of the plane perpendicular to the axis of said axle.

7. The driven wheel according to claim 6 wherein said globular chambers are arranged in two rows, about the periphery of said body, the chambers of one row alternatingly staggering with the chambers of the other row in contact with the ground.

8. The driven wheel according to claim 5 wherein said suspension system includes a central bearing pin journaled in a bushing, said central bearing pin having a hollow interior divided into two independent portions respectively communicating with the arms of said suspension system, and means conducting gas from said gas source to one of said interior portions and means conducting gas from said other interior portion back to said gas source to provide a closed gas system.

* * * * *